United States Patent
Saito et al.

(10) Patent No.: US 10,153,672 B2
(45) Date of Patent: Dec. 11, 2018

(54) ROTARY ELECTRIC MACHINE AND ELECTRIC VEHICLE PROVIDED WITH SAME

(71) Applicant: Hitachi Automotive Systems, Ltd., Hitachinaka-shi, Ibaraki (JP)

(72) Inventors: Yasuyuki Saito, Hitachinaka (JP); Yuji Kanoh, Hitachinaka (JP); Tomohiro Adachi, Hitachinaka (JP); Motoo Kitahara, Hitachinaka (JP); Tomohiro Fukuda, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 219 days.

(21) Appl. No.: 15/037,566

(22) PCT Filed: Oct. 20, 2014

(86) PCT No.: PCT/JP2014/077770
§ 371 (c)(1),
(2) Date: May 18, 2016

(87) PCT Pub. No.: WO2015/076045
PCT Pub. Date: May 28, 2015

(65) Prior Publication Data
US 2016/0301271 A1    Oct. 13, 2016

(30) Foreign Application Priority Data

Nov. 20, 2013  (JP) .................................. 2013-239452

(51) Int. Cl.
*H02K 1/27*  (2006.01)
*B60L 11/12*  (2006.01)
(Continued)

(52) U.S. Cl.
CPC .......... *H02K 1/2766* (2013.01); *B60L 11/123* (2013.01); *B60L 11/14* (2013.01);
(Continued)

(58) Field of Classification Search
CPC ............. H02K 1/24; H02K 1/27; H02K 21/16
(Continued)

(56) References Cited

U.S. PATENT DOCUMENTS 4,358,697 A * 11/1982 Liu .................... H02K 21/46
310/156.56
4,922,152 A * 5/1990 Gleghorn ............. H02K 1/2766
29/598

(Continued)

FOREIGN PATENT DOCUMENTS

EP    2 061 132 A1    5/2009
EP    2 246 966 A1    11/2010
(Continued)

OTHER PUBLICATIONS

Extended European Search Report issued in counterpart European Patent Application No. 14863370.4 dated Jun. 21, 2017 (Thirteen (13) pages).

(Continued)

*Primary Examiner* — Burton Mullins
(74) *Attorney, Agent, or Firm* — Crowell & Moring LLP

(57) ABSTRACT

A rotating electric machine, which can achieve improvement of a reluctance torque, reduction of stress and improvement of a power factor at the same time, and can also realize high output, and an electrically driven vehicle having the rotating electric machine are provided. A permanent magnet is arranged on a q-axis that connects magnetic poles of a rotor; a gap is formed in a radial direction of the permanent magnet; another permanent magnet is arranged facing the said permanent magnet so that these permanent magnets (Continued)

may sandwich a d-axis which connects centers of the magnetic poles; and another gap is formed at a position corresponding to a position of the said gap. Further, a first virtual line that coincides with a boundary of a permanent magnet insertion hole, which is arranged facing the d-axis, on an inner circumference side of a rotor core; and a second virtual line that is concentric with an inner circumference of the rotor core and contacts the first vertical line are set so that the second virtual line on the innermost circumference and the first virtual line have two or more tangent points.

5 Claims, 8 Drawing Sheets

(51) Int. Cl.
  *B60L 11/14* (2006.01)
  *B60L 11/18* (2006.01)
  *B60L 15/00* (2006.01)
  *H02K 1/24* (2006.01)
(52) U.S. Cl.
  CPC ....... *B60L 11/1803* (2013.01); *B60L 11/1861* (2013.01); *B60L 11/1864* (2013.01); *B60L 15/007* (2013.01); *H02K 1/246* (2013.01); *B60L 2210/10* (2013.01); *B60L 2210/40* (2013.01); *B60L 2240/12* (2013.01); *B60L 2240/421* (2013.01); *B60L 2240/423* (2013.01); *H02K 1/2773* (2013.01); *Y02T 10/6217* (2013.01); *Y02T 10/641* (2013.01); *Y02T 10/645* (2013.01); *Y02T 10/7005* (2013.01); *Y02T 10/7044* (2013.01); *Y02T 10/7061* (2013.01); *Y02T 10/7077* (2013.01); *Y02T 10/7216* (2013.01); *Y02T 10/7241* (2013.01)
(58) Field of Classification Search
  USPC ........................................ 310/156.53, 156.56
  See application file for complete search history.

(56) References Cited

U.S. PATENT DOCUMENTS

| | | | | |
|---|---|---|---|---|
| 7,425,786 B2* | 9/2008 | Hino | ...................... | H02K 1/276 310/156.53 |
| 7,560,842 B2* | 7/2009 | Hattori | ................. | H02K 1/2766 310/156.53 |
| 7,923,881 B2* | 4/2011 | Ionel | ...................... | H02K 21/46 310/156.53 |
| 8,044,548 B2* | 10/2011 | Sakai | ................... | H02K 1/2766 310/156.36 |
| 8,089,190 B2* | 1/2012 | Lee | ......................... | H02K 1/276 310/156.53 |
| 2005/0140236 A1 | 6/2005 | Jeong et al. | | |
| 2006/0113858 A1 | 6/2006 | Hino et al. | | |
| 2011/0254474 A1* | 10/2011 | Saito | ........................ | H02K 1/24 318/139 |
| 2015/0115758 A1 | 4/2015 | Koka et al. | | |
| 2015/0171682 A1* | 6/2015 | Fujisawa | .............. | H02K 1/2766 310/156.53 |

FOREIGN PATENT DOCUMENTS

| | | | | |
|---|---|---|---|---|
| JP | 8-275419 A | | 10/1996 | |
| JP | 2005-198487 A | | 7/2005 | |
| JP | 2009-153352 A | | 7/2009 | |
| JP | 2009153352 A | * | 7/2009 | ............... H02K 1/27 |
| JP | 4668721 B2 | | 4/2011 | |
| JP | 2012-29563 A | | 2/2012 | |
| JP | 2013-225997 A | | 10/2013 | |

OTHER PUBLICATIONS

International Search Report (PCT/ISA/210) issued in PCT Application No. PCT/JP2014/077770 dated Dec. 16, 2014 with English-language translation (four (4) pages).

Japanese-language Written Opinion (PCT/ISA/237) issued in PCT Application No. PCT/JP201/077770 dated Dec. 16, 2014 (six (6) pages).

* cited by examiner

ROTARY ELECTRIC MACHINE AND ELECTRIC VEHICLE PROVIDED WITH SAME

TECHNICAL FIELD

The present invention relates to a rotating electric machine and an electrically driven vehicle having the same.

BACKGROUND ART

Rotating electric machines used for driving vehicles, including inverters as their control circuits, have been required to have smaller sizes and to achieve higher output. In particular, permanent magnet-type rotating electric machines, which can generate large torques in low-speed rotation regions and can achieve high output also in high-speed rotation regions, have been desired. Therefore, as such permanent magnet-type rotating electric machines, embedded magnet-type rotating electric machines, which can adopt weak field systems during high-speed rotation and can utilize reluctance torques, have been mostly used. For example, Publication of U.S. Pat. No. 4,668,721 describes a structure of such an embedded magnet-type rotating electric machine.

CITATION LIST

Patent Literature

PTL 1: Publication of U.S. Pat. No. 4,668,721

SUMMARY OF INVENTION

Technical Problem

However, in order to obtain a larger reluctance torque, a structure of a rotor core becomes complicated, and stress generated due to centrifugal force becomes higher, so that its rotational speed is difficult to be increased. Besides, inductance is also increased, so that a power factor deteriorates, thereby causing a problem that a more inverter capacity and battery capacity are required.

Then, an object of the invention is to provide a rotating electric machine, which can generate a large reluctance torque, can reduce stress, and has an improved power factor, and an electrically driven vehicle having the rotating electric machine.

Solution to Problem

In the rotating electric machine according to the present invention, a permanent magnet is arranged on a q-axis that connects magnetic poles of a rotor; a gap is formed in a radial direction of the permanent magnet; another permanent magnet is arranged facing the said permanent magnet so that these permanent magnets may sandwich a d-axis which connects centers of the magnetic poles; and another gap is formed at a position corresponding to a position of the said gap. Further, a first virtual line that coincides with a boundary of a permanent magnet insertion hole, which is arranged facing the d-axis, on an inner circumference side of a rotor core; and a second virtual line that is concentric with an inner circumference of the rotor core and contacts the first vertical line are set so that the second virtual line on the innermost circumference and the first virtual line have two or more tangent points.

Advantageous Effects of Invention

According to the present invention, a rotating electric machine, which can achieve improvement of a reluctance torque, reduction of stress and improvement of a power factor at the same time, and can also realize high output, and an electrically driven vehicle having the rotating electric machine can be provided.

Problems, structures and effects that are not stated above will be clarified by following description of embodiments.

DESCRIPTION OF EMBODIMENTS

Embodiments for carrying out the present invention will be hereinafter described with reference to the accompanying drawings.

A rotating electric machine according to the present invention can achieve improvement of a reluctance torque, reduction of stress and improvement of a power factor at the same time, and can also realize high output, as described below. Thus, the rotating electric machine is preferably used as a rotating electric machine for driving an electric vehicle, for example. The rotating electric machine according to the present invention can be adopted to a simple electric vehicle that travels only with a rotating electric machine and a hybrid electric vehicle that is driven by both of an engine and a rotating electric machine, and a hybrid electric vehicle will be explained as an example in the following explanation.

Figure 1:
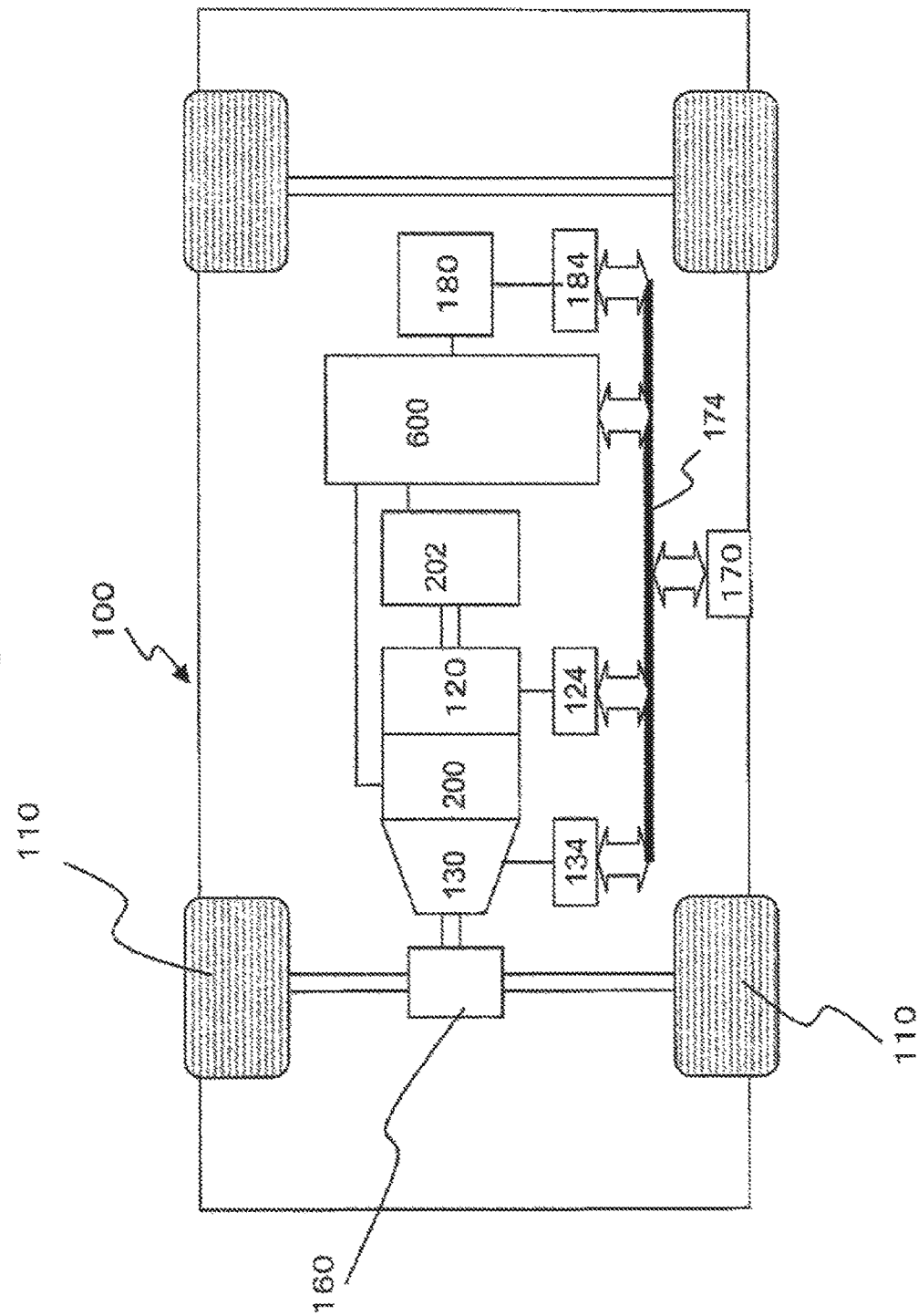
FIG. 1 is a view illustrating a schematic structure of a hybrid electric vehicle.

FIG. 1 is a view illustrating a schematic structure of a hybrid electric vehicle that incorporates a rotating electric machine of one embodiment of the present invention. A vehicle 100 includes: an engine 120; a first rotating electric machine 200; a second rotating electric machine 202; and a battery 180. When driving force of the rotating electric machines 200 and 202 is required, the battery 180 supplies direct current electric power to the rotating electric machines 200 and 202 via an electric power conversion device 600, and the battery receives direct current electric power from the rotating electric machines 200 and 202 during regeneration traveling. The direct current electric power is given and received via the electric power conversion device 600 between: the battery 180; and the rotating electric machines 200 and 202. Further, a battery for supplying low-voltage electric power (for example, 14-volt electric power), which is not illustrated, is mounted on the vehicle, and supplies direct current electric power to a control circuit that will be described below.

A rotational torque generated by the engine 120 and the rotating electric machines 200 and 202 is transferred via a transmission 130 and a differential gear 160 to front wheels 110. The transmission 130 is controlled by a transmission control device 134, and the engine 120 is controlled by an engine control device 124. The battery 180 is controlled by a battery control device 184. The transmission control device 134, the engine control device 124, the battery control device 184, the electric power conversion device 600 and an integrated control device 170 are connected via a communication line 174.

The integrated control device 170 is a host control device of: the transmission control device 134; the engine control device 124; the electric power conversion device 600; and the battery control device 184, and receives information that indicates respective states of: the transmission control device 134; the engine control device 124; the electric power conversion device 600; and the battery control device 184 via the communication line 174 from these respective devices. The integrated control device 170 calculates control orders of the respective devices based on the thus obtained information. The calculated control orders are transmitted via the communication line 174 to the respective devices.

The high-voltage battery 180 is constituted by a secondary battery such as a lithium-ion battery and a nickel-hydrogen battery, and outputs direct current electric power at a high voltage ranging from 250 volts to 600 volts or more. The battery control device 184 outputs a charge/discharge state of the battery 180 and states of respective unit cells that constitute the battery 180 via the communication line 174 to the integrated control device 170.

When judging that the battery 180 is necessary to be charged based on the information from the battery control device 184, the integrated control device 170 gives an order of generating operation to the electric power conversion device 600. Moreover, the integrated control device 170 mainly performs: administration of output torques of the engine 120 and the rotating electric machines 200 and 202; arithmetic processing of a total torque and a torque distribution ratio of the output torque of the engine 120 and the output torques of the rotating electric machines 200 and 202; and transmits a control order based on a result of the arithmetic processing to the transmission control device 134, the engine control device 124 and the electric power conversion device 600. The electric power conversion device 600 controls the rotating electric machines 200 and 202 based on the torque order from the integrated control device 170 so that the torque output or electric power may be generated as ordered.

The electric power conversion device 600 is provided with a power semiconductor that constitutes an inverter for operating the rotating electric machines 200 and 202. The electric power conversion device 600 controls switching operation of the power semiconductor based on the order from the integrated control device 170. According to this switching operation of the power semiconductor, the rotating electric machines 200 and 202 are operated as electric motors or power generators.

In the case of operating the rotating electric machines 200 and 202 as electric motors, direct current electric power from the high-voltage battery 180 is supplied to a direct-current terminal of the inverter of the electric power conversion device 600. The electric power conversion device 600 converts the direct current electric power, which is supplied by controlling the switching operation of the power semiconductor, into three-phase alternating current electric power, and supplies the three-phase alternating current electric power to the rotating electric machines 200 and 202. Whereas, in the case of operating the rotating electric machines 200 and 202 as power generators, rotors of the rotating electric machines 200 and 202 are driven rotationally at a rotational torque that is applied externally, whereby the three-phase alternating current electric power is generated to stator winding lines of the rotating electric machines 200 and 202. The generated three-phase alternating current electric power is converted into direct current electric power by the electric power conversion device 600, and the direct current electric power is supplied to the high-voltage battery 180, whereby the battery 180 is charged.

Figure 2:
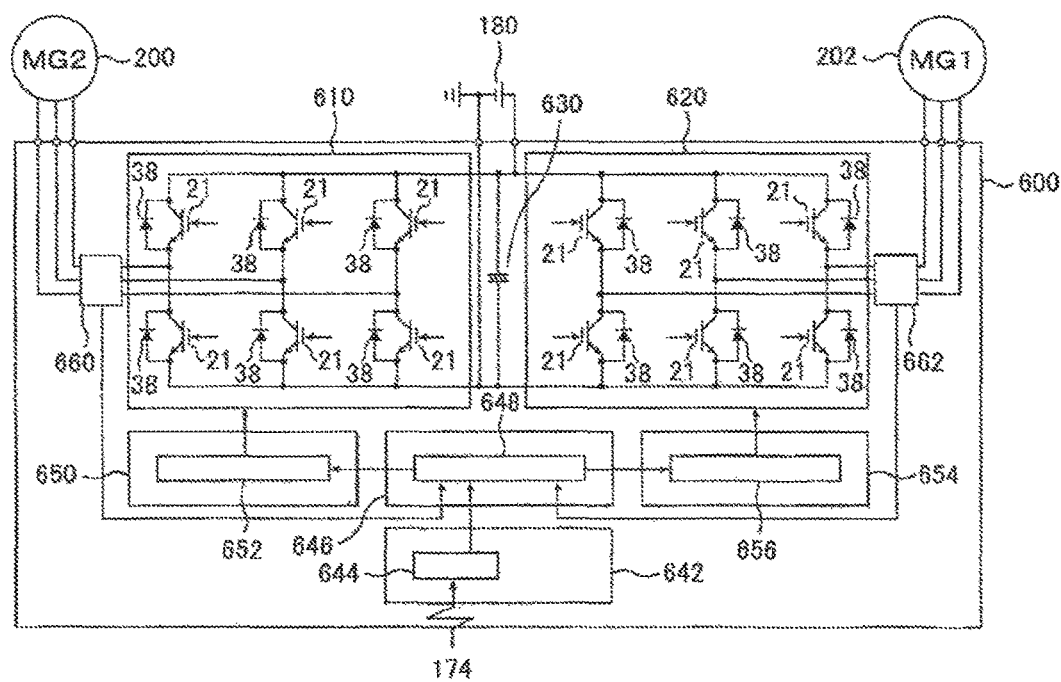
FIG. 2 is a circuit diagram of an electric power conversion device 600.

FIG. 2 is a circuit diagram of the electric power conversion device 600 in FIG. 1. The electric power conversion device 600 is provided with: a first inverter for the rotating electric machine 200; and a second inverter for the rotating electric machine 202. The first inverter includes: a power module 610; a first driving circuit 652 that controls switching operation of respective power semiconductors 21 of the power module 610; and a current sensor 660 that detects a current of the rotating electric machine 200. The driving circuit 652 is provided on a driving circuit substrate 650.

The second inverter includes: a power module 620; a second driving circuit 656 that controls switching operation of respective power semiconductors 21 of the power module 620; and a current sensor 662 that detects a current of the rotating electric machine 202. The driving circuit 656 is provided on a driving circuit substrate 654. A control circuit 648 provided on a control circuit substrate 646, a capacitor module 630 and a transmitter-receiver circuit 644 packaged on a connector substrate 642 are used commonly for the first inverter and the second inverter.

The power modules 610 and 620 are operated according to driving signals output from the driving circuits 652 and 656 which correspond to the power modules 610 and 620, respectively. The power modules 610 and 620 convert the direct current electric power supplied by the battery 180 into three-phase alternating current electric power, and supply the electric power to the stator winding lines that are armature winding lines of their corresponding rotating electric machines 200 and 202, respectively. Further, the power modules 610 and 620 convert the alternating current electric power that is induced in the stator winding lines of the rotating electric machines 200 and 202 into direct current electric power, and supply the direct current electric power into the high-voltage battery 180.

As illustrated in FIG. 2, the power modules 610 and 620 have three-phase bridge circuits, in which series circuits corresponding to the three phases are electrically connected in parallel between a positive electrode and a negative electrode of the battery 180, respectively. Each of the series circuits includes the power semiconductors 21 that constitute an upper arm and the power semiconductors 21 that constitute a lower arm, and these power semiconductors 21 are connected in series. The power module 610 and the power module 620 have the substantially same circuit structures as illustrated in FIG. 2, and the power module 610 will be explained below as a representative.

In the present embodiment, IGBTs (Insulated Gate-type Bipolar Transistors) 21 are used as power semiconductor elements for switching. The IGBT 21 includes three electrodes of: a collector electrode; an emitter electrode; and a gate electrode. To the collector electrode and the emitter electrode of the IGBT 21, a diode 38 is electrically connected. The diode 38 includes two electrodes of: a cathode electrode; and an anode electrode, where the cathode electrode is electrically connected to the collector electrode of the IGBT 21, and the anode electrode is electrically connected to the emitter electrode of the IGBT 21 so that a direction from the emitter electrode to the collector electrode of the IGBT 21 may be a forward direction.

Incidentally, as the power semiconductor element for switching, a MOSFET (Metal-Oxide Semiconductor Field-Effect Transistor) may also be used. The MOSFET includes three electrodes of: a drain electrode; a source electrode; and a gate electrode. In the case of using the MOSFET, since the MOSFET includes a parasitic diode between the source electrode and the drain electrode so that a direction from the drain electrode to the source electrode may be a forward direction, the diode 38 shown in FIG. 2 is not necessary to be provided.

Arms of the respective phases are constituted by electrically connecting the emitter electrode of the IGBT 21 and the collector electrode of the IGBT 21 in series. Incidentally, only the one IGBT is illustrated for each of the upper and lower arms of each phase in the present embodiment, but actually, the plural IGBTs are electrically connected to each other in parallel, because a current capacity to be controlled thereby is large. For simpler explanation, an example of only the one power semiconductor will be provided.

In the example shown in FIG. 2, each of the upper and lower arms of each phase is constituted of the three IGBTs. The collector electrode of the IGBT 21 of each upper arm of each phase is electrically connected to the positive electrode of the battery 180, and the source electrode of the IGBT 21 of each lower arm of each phase is electrically connected to the negative electrode of the battery 180. A middle point of each arm of each phase (a connecting portion between the emitter electrode of the upper arm-side IGBT and the collector electrode of the lower arm-side IGBT) is electrically connected to the armature winding line (the stator winding line) of the corresponding phase of the corresponding rotating electric machine 200 or 202.

The driving circuits 652 and 656 respectively constitute driving units for controlling the corresponding inverters 610 and 620, and generate driving signals for driving the IGBTs 21 based on a control signal that is output from the control circuit 648. The driving signals generated by the driving circuits 652 and 656 are output to gates of the power semiconductor elements of the corresponding power modules 610 and 620, respectively. Each of the driving circuits 652 and 656 is provided with six integrated circuits that generate the driving signals to be supplied to the gates of the upper and lower gates of the respective phases, and the six integrated circuits are constituted as one block.

The control circuit 648 constitutes as a control unit for the inverters 610 and 620, and is structured by a microcomputer that calculates a control signal (a control value) for operating (turning on and off) the plural power semiconductor elements for switching. Into the control circuit 648, a torque order signal (a torque order value) from a host control device; sensor outputs of the current sensors 660 and 662; and sensor outputs of rotation sensors that are incorporated in the rotating electric machines 200 and 202 are input. The control circuit 648 calculates the control value based on these input signals, and outputs the control signal for controlling a switching timing to the driving circuits 652 and 656.

The transmitter-receiver circuit 644 packaged on a connector substrate 642 is for electrically connecting the electric power conversion device 600 and an external control device with each other, and transmits and receives information to and from another device via the communication line 174 of FIG. 1. The capacitor module 630 constitutes a smoothing circuit for suppressing fluctuation of a direct current voltage that is generated due to the switching operation of the IGBTs 21, and is electrically connected to direct current-side terminals of the first power module 610 and the second power module 620 in parallel.

Figure 3:
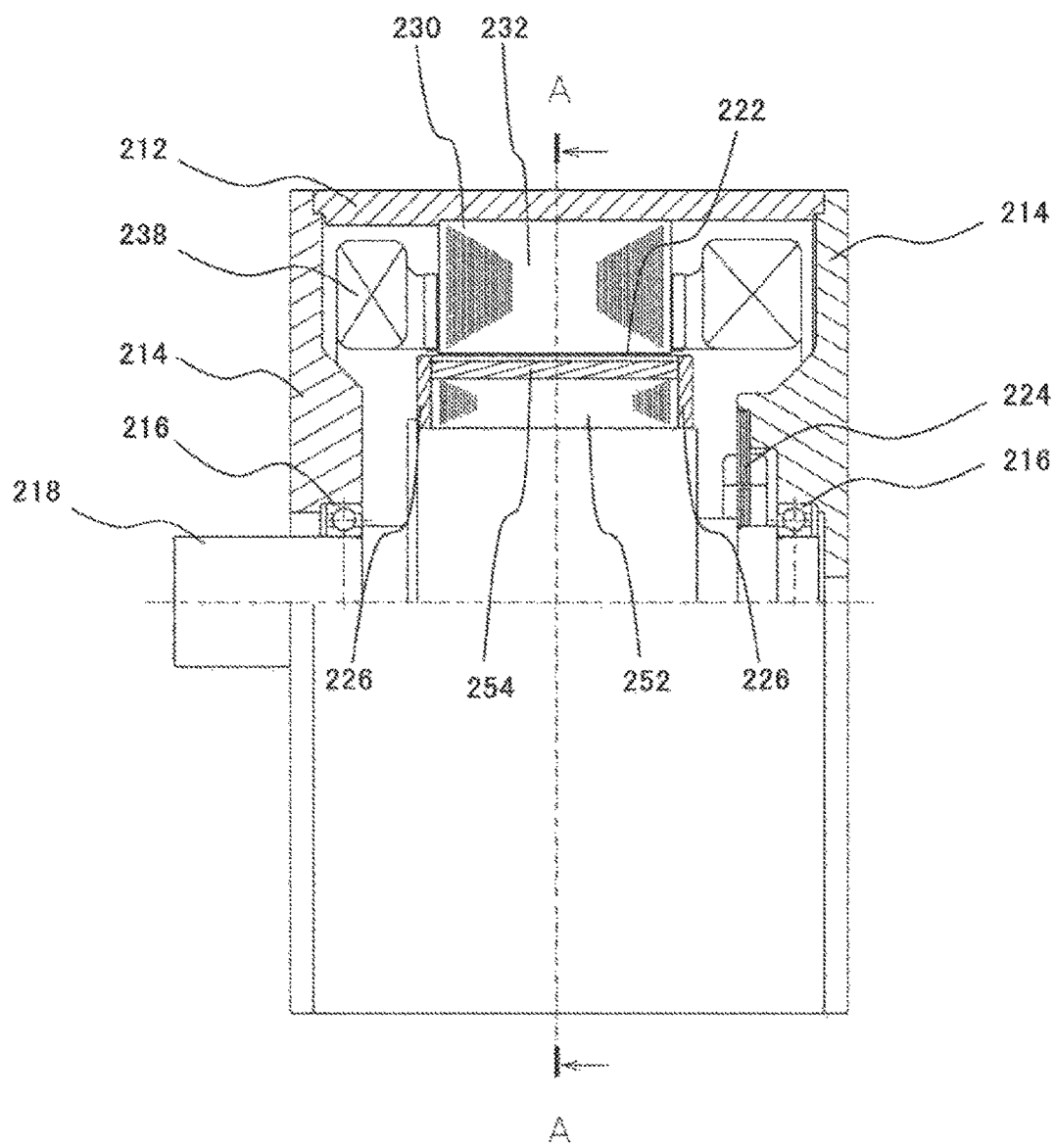
FIG. 3 is a cross-sectional view of a rotating electric machine 200.

FIG. 3 illustrates a cross-sectional view of the rotating electric machine 200 in FIG. 1. The rotating electric machine 200 and the rotating electric machine 202 have substantially the same structures, and the structure of the rotating electric machine 200 will be explained below as a representative example. Incidentally, both of the rotating electric machines 200 and 202 are not required to adopt the below-described structure, and only one of them may adopt the structure.

A stator 230 is held inside a housing 212, and includes: a stator core 232; and a stator winding line 238. On an inner circumference side of the stator core 232, the rotor 250 is held rotatably via a gap 222. The rotor 250 includes: a rotor core 252 fixed to a shaft 218; permanent magnets 254; and a cover plate 226 made of a non-magnetic material. The housing 212 has a pair of end brackets 214 that are respectively provided with bearings 216, and the shaft 218 is held rotatably by these bearings 216.

The shaft 218 is provided with a resolver 224 that detects positions of poles and a rotational speed of the rotor 250. An output of this resolver 224 is taken into the control circuit 648 shown in FIG. 2. The control circuit 648 outputs a control signal to the driving circuit 652 based on the taken output. The driving circuit 652 outputs the driving signal based on the control signal to the power module 610. The power module 610 performs switching operation based on the control signal, and converts the direct current electric power supplied by the battery 180 into three-phase alternating current electric power. This three-phase alternating current electric power is supplied to the stator winding line 238 shown in FIG. 3, whereby a rotating magnetic field is generated in the stator 230. A frequency of a three-phase alternating current is controlled based on the output value of the resolver 224, and a phase of the three-phase alternating current with respect to the rotor 250 is controlled based on the output value of the resolver 224 as well.

Figure 4:
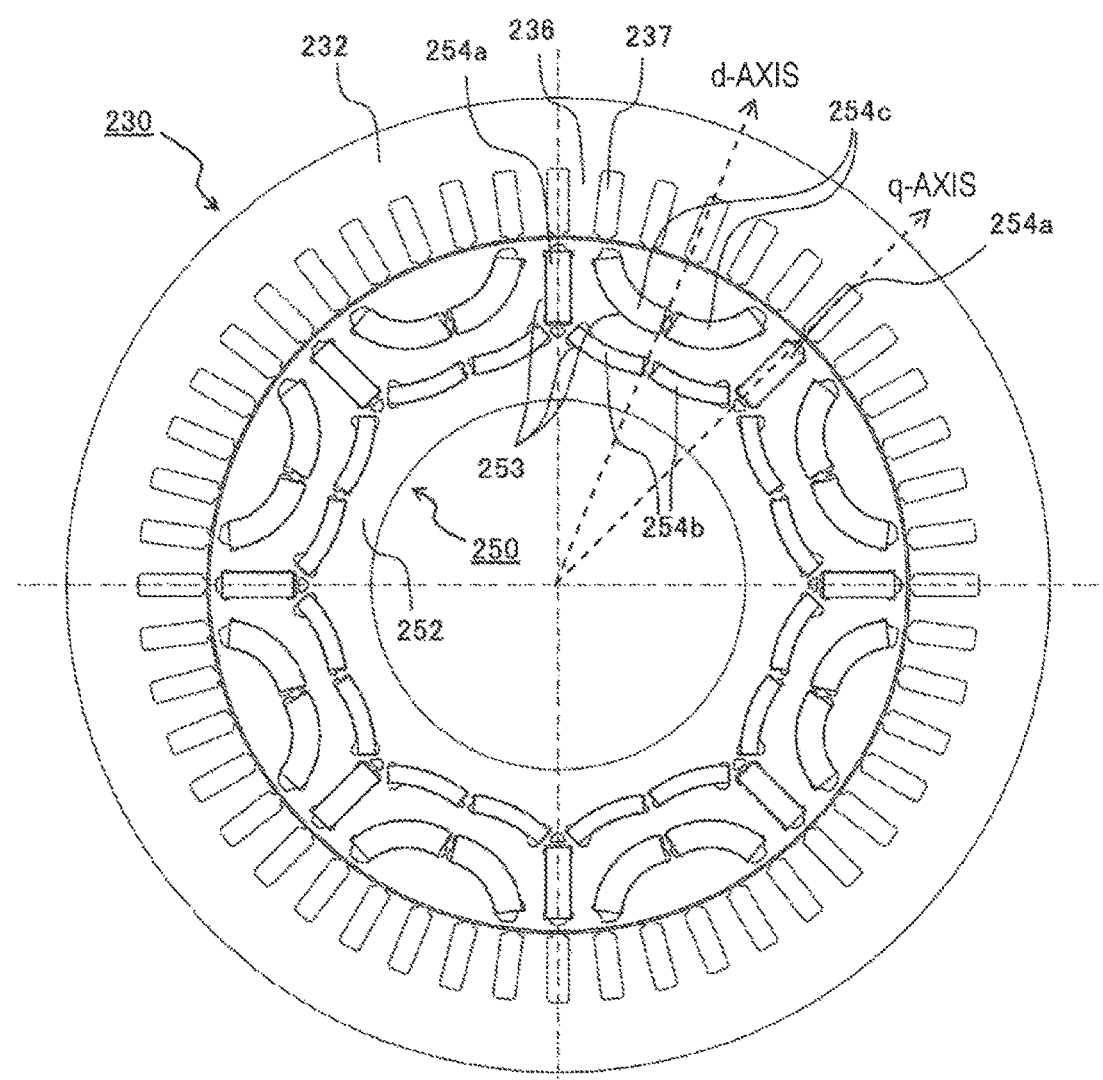
FIG. 4 is a cross-sectional view of a stator 230 and a rotor 250.

FIG. 4 is a view illustrating a cross section of the stator 230 and the rotor 250, which is a cross-sectional view taken along a line A-A of FIG. 3. Incidentally, FIG. 4 omits the illustration of the housing 212, the shaft 218 and the stator winding line 238.

On an inner circumference side of the stator iron core 232, many slots 237 and teeth 236 are arranged evenly over the whole circumference. In the present embodiment, the forty eight slots 237 are formed at equal intervals. Incidentally, FIG. 4 does not impart reference codes to all of the slots and teeth, but provides the codes only to some of them as representatives. To an inside of the slot 24, slot insulation (not illustrated) is provided, where plural phase winding lines of u-phases to w-phases that constitute the stator winding lines 238 are attached. In the present embodiment, distributed winding is adopted as a method for winding the stator winding lines 238.

The distributed winding is a winding method in which a phase winding line is wound around the stator iron core 232 so that the phase winding line may be stored into the two slots which are separated over the plural slots 237. In the present embodiment, since the distributed winding is adopted as the winding method, a formed magnetic flux distribution has substantially a sine wave shape, and a reluctance torque is likely to be obtained. Thus, by utilizing weak field control and such a reluctance torque, the number of rotations can be controlled in a wide range from a low rotational speed to a high rotational speed, so that the distributed winding is suitable for obtaining motor characteristics for electric vehicles and the like.

Further, inside the rotor core 252, plural magnet insertion holes 253 into which the permanent magnets are respectively inserted are provided at equal intervals in each pole unit. The respective magnet insertion holes 253 are formed along an axis direction, and the permanent magnets 254 are embedded into the magnet insertion holes 253, respectively.

Generally, an axis along a center of a magnetic pole is called as a d-axis, and an axis along a center line between magnetic poles is called as a q-axis. The permanent magnet 254a is arranged on the q-axis, and the permanent magnet 254b and the permanent magnet 254c are arranged facing with each other so as to sandwich the d-axis. The permanent magnet 254a has a substantially a rectangular shape, and the permanent magnet 254b and the permanent magnet 254c have substantially arc shapes. These permanent magnets act as field poles of the rotor 250, which are eight poles in the present embodiment. Moreover, a magnetization direction of the permanent magnet 254a crosses orthogonally to the q-axis, and magnetization directions of the permanent magnets 254b and 254c are their respective inner-circumferential radial directions, so that their magnetization directions become reverse alternately according to their magnetic poles. That is, if a center of a certain magnetic pole is magnetized to have an N-pole on the outer circumferential face of the rotor 250, a center of a next magnetic pole is magnetized to have an S-pole, so that centers of such magnetic poles are magnetized to have alternate poles in the circumferential direction.

The permanent magnets 254 may be inserted into the magnet insertion holes 253 after being magnetized, or may be magnetized by application of strong magnetic fields after being inserted into the magnet insertion holes 253 of the rotor core 252. However, since the magnetized permanent magnets 254 are strong magnets, if the permanent magnets 254 are magnetized before being fixed to the rotor 250, strong suction force is generated between the permanent magnets 254 and the rotor core 252, when fixing the permanent magnets 254 thereto, so as to interrupt the assembly. Further, due to the strong suction force of the permanent magnets 254, dust such as iron powder may be attached to the permanent magnets 254. Accordingly, in the light of the productivity of the rotating electric machine, it is preferable to magnetize the permanent magnets 254 after being inserted into the rotor core 252.

Figure 5:
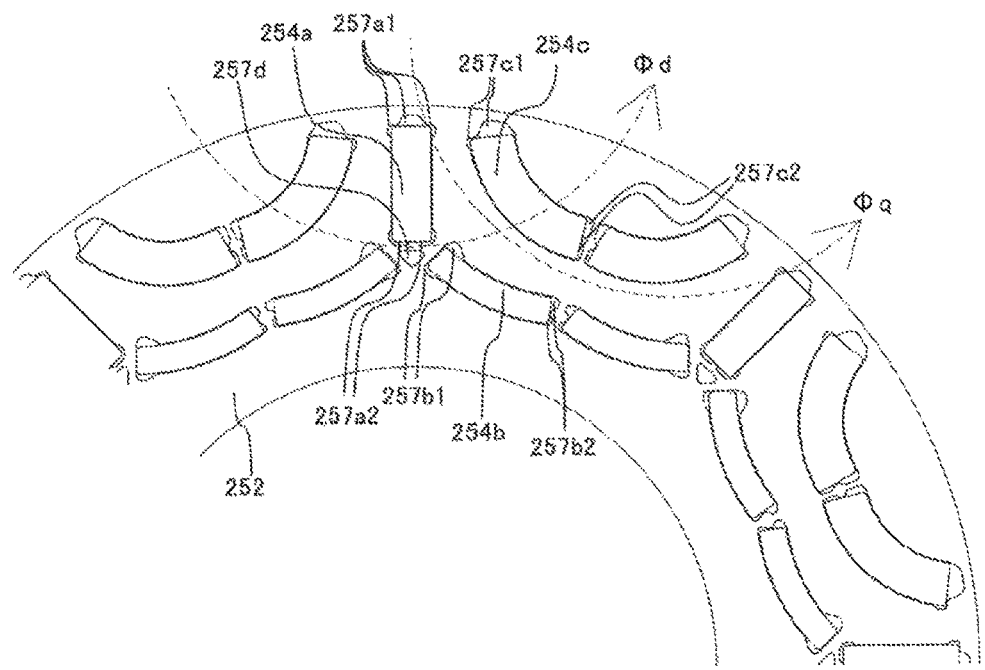
FIG. 5 is a partial enlarged cross-sectional view of the rotor 250.

FIG. 5 enlargingly illustrates a part of the cross section of FIG. 4. The permanent magnets 254a, 254b and 254c are respectively inserted into the magnet insertion holes 253, and are fixed thereto with an adhesive agent. Some of the magnet insertion holes 253 are set to have larger sizes than dimensions of the permanent magnets with clearances more than the necessity for the assembly, so that, according to the difference in sizes, there are hole spaces 257a1 and 257a2 at ends of the permanent magnet 254a; there are hole spaces 257b1 and 257b2 at ends of the permanent magnet 254b; and there are hole spaces 257c1 and 257c2 at ends of the permanent magnet 254c, which function as magnetic gaps. Moreover, there is also a hole space 257d which is set apart from the magnet insertion holes 253, and this hole space 257d also functions as a magnetic gap. This hole space is not necessarily a perfect space, may be filled up with an adhesive agent, and may be fixed with the permanent magnet by molding resin.

The hole spaces 257a1 are formed at corners of the permanent magnet 254a and at a center of the end of the permanent magnet 254a, and the hole spaces 257a2 are formed at corners of the permanent magnet 254a. The hole spaces 257b1 and 257b2 are formed at corners of the permanent magnet 254b. The hole spaces 257c1 are formed at corners of the permanent magnet 254c on an inner circumference side of the rotor and from a center of the end to corners of the permanent magnet 254c on an outer circumference side of the rotor, and the hole spaces 257c2 are formed at corners of the permanent magnet 254c. The hole space 257d is formed between the permanent magnet 254a and the permanent magnet 254b that face each other.

Figure 6:
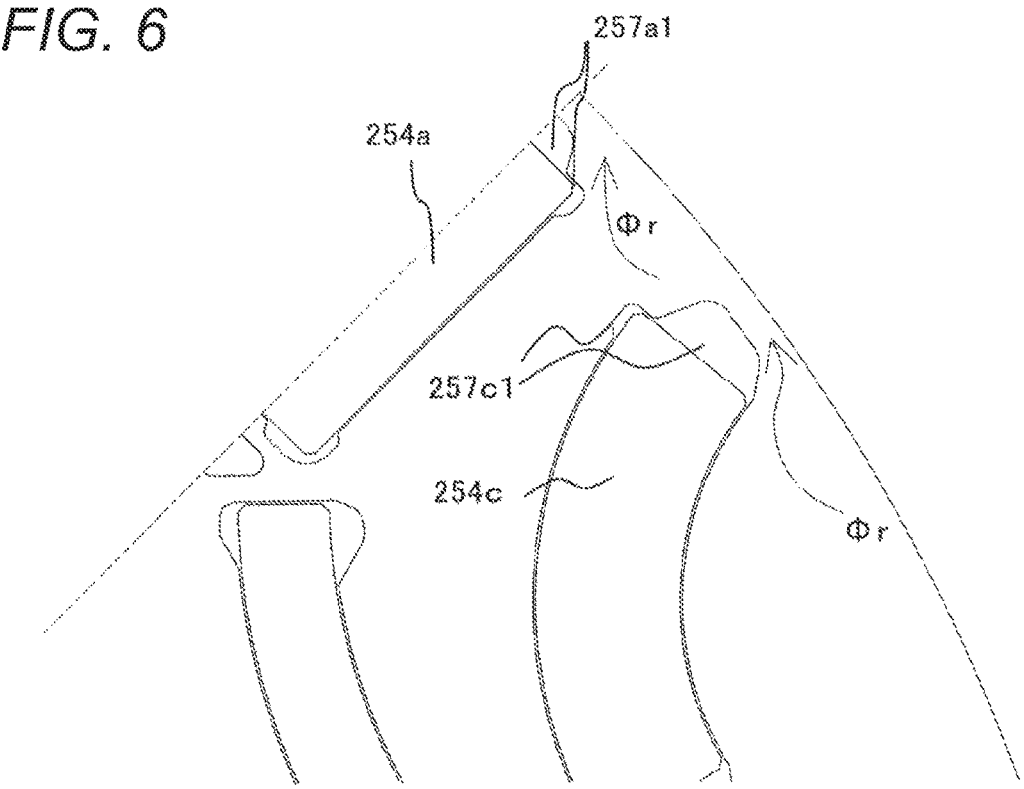
FIG. 6 is a view illustrating a magnetic flux in an opposing magnetic field toward a permanent magnet 254a and a permanent magnet 254c.

That is, the hole spaces adjacent to an outer circumference of the rotor core 252, such as the hole spaces 257a1 and the hole spaces 257c1, exist at the centers of the ends of the permanent magnets. Each of the hole spaces can have a large angle R, and thus has a function of releasing concentration of the stress. However, the hole spaces 257a1 and 257c1 are capable of increasing magnetic resistance of the permanent magnets 254 on the outer circumference side of the rotor core 252, and can allow a magnetic flux $\Phi r$ in a direction opposite to a magnetization direction of the permanent magnet, which is generated during the operation of the rotating electric machine, to escape toward the outer circumference of the rotor core as shown in FIG. 6, thereby improving demagnetization durability of the rotor against an opposing magnetic field.

A magnetic flux $\Phi q$ shown in FIG. 5 denotes a magnetic flux along the q-axis, and a magnetic flux $\Phi d$ denotes a magnetic flux along the d-axis. The reluctance torque is generated based on a difference between: magnetic resistance of a magnetic path for the magnetic flux $\Phi q$ to pass through; and magnetic resistance of a magnetic path for the magnetic flux $\Phi d$ to pass through. Further, a magnetic torque is represented by a product of: a component interlinked to each phase winding line among the magnetic fluxes that are generated by the permanent magnets 254; and a component crossing orthogonally to an interlinkage flux among an alternating current that flows through each phase winding line.

According to the present embodiment, since a width of the rotor core 252 is wide, the magnetic resistance of the magnetic path for allowing the magnetic flux $\Phi q$ to pass through can be small. Besides, since the permanent magnet 254a and the permanent magnet 254c with low magnetic permeability are present on the magnetic path for allowing the magnetic flux $\Phi d$ to pass through, the magnetic resistance of the path is high, and a difference between the magnetic resistances of the magnetic paths for the magnetic fluxes $\Phi q$ and $\Phi d$ can be large, so that a large reluctance torque can be obtained. Further, as the permanent magnets 254, neodymium-based and samarium-based sintered magnets, ferrite magnets, neodymium-based bonded magnets and the like can be used, and their residual magnetic flux densities are about 0.3 T to 1.3 T. However, according to the present embodiment, surface areas of the permanent magnets are larger than those of a typical permanent magnet-type rotating electric machine, and all of the magnetization directions of the permanent magnets 254a, 254b and 254c are set to gather near the center of the magnetic pole, whereby many interlinkage fluxes can be obtained. Accordingly, even by using the permanent magnets with small residual magnetic flux densities, the decrease of the magnetic torque is small. Therefore, even if using permanent magnets with residual magnetic flux densities of about 0.3 T to 0.8 T, a sufficient performance can be obtained.

Generally, a permanent magnet-type rotating electric machine with a large reluctance torque has drawbacks that inductance is increased, a power factor is degraded thereby, and a maximum output is decreased. However, according to the present embodiment, since the many permanent magnets are used, and in particular, the permanent magnet 254a enlarges the magnetic resistance of the magnetic path and thus can decrease the impedance, the degradation of the power factor can be suppressed, and deterioration of the output in a high-speed rotation region can be prevented. For this improvement of the power factor, the dimension of the permanent magnet 254a in its magnetization direction is set to be larger than that of the permanent magnet 254b in its magnetization direction.

Figure 7:
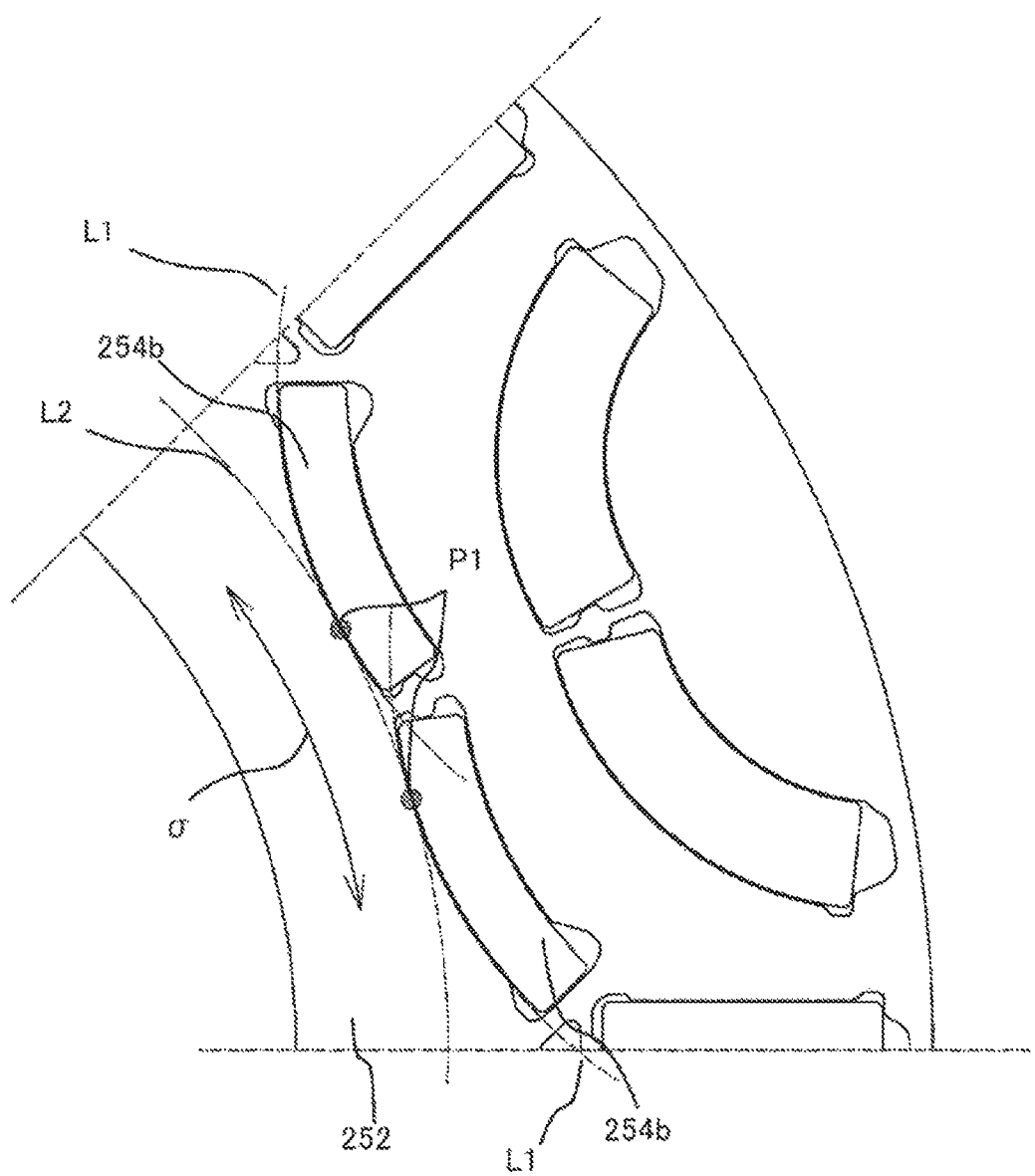
FIG. 7 is a view for explaining an arrangement of a permanent magnet 254b.

FIG. 7 is enlargingly illustrates one pole in the cross-sectional view of FIG. 5. Conventionally, if using many permanent magnets so as to make a configuration of the rotor core 252 complicated, there is a problem that stress is concentrated during high-speed rotation, and, despite that an output seems possible during the high-speed rotation over a magnetic circuit, such a conventional rotating electric machine mechanically cannot cope with the high-speed rotation. Due to centrifugal force that is generated to the rotor core 252 and the permanent magnets 254 during the high-speed rotation, a stress vector σ is generated in the substantially circumferential direction of the rotor core 252, and the stress is concentrated to a part that is convex with respect to the stress vector σ. On the other hand, according to the present embodiment, since there are two tangent points P1 between: a virtual line L1 that coincides with a boundary of the magnet insertion hole, into which the permanent magnet 254b is inserted, on the inner circumference side of the rotor core 252; and a virtual line L2 that is concentric with the inner circumference of the rotor core 252, and contacts the virtual line L1, the stress can be dispersed, whereby the high-speed rotation is possible also mechanically. Incidentally, there are the two tangent points in the present embodiment, and the stress can be dispersed, only if there are two or more tangent points in one magnetic pole.

Figure 8:
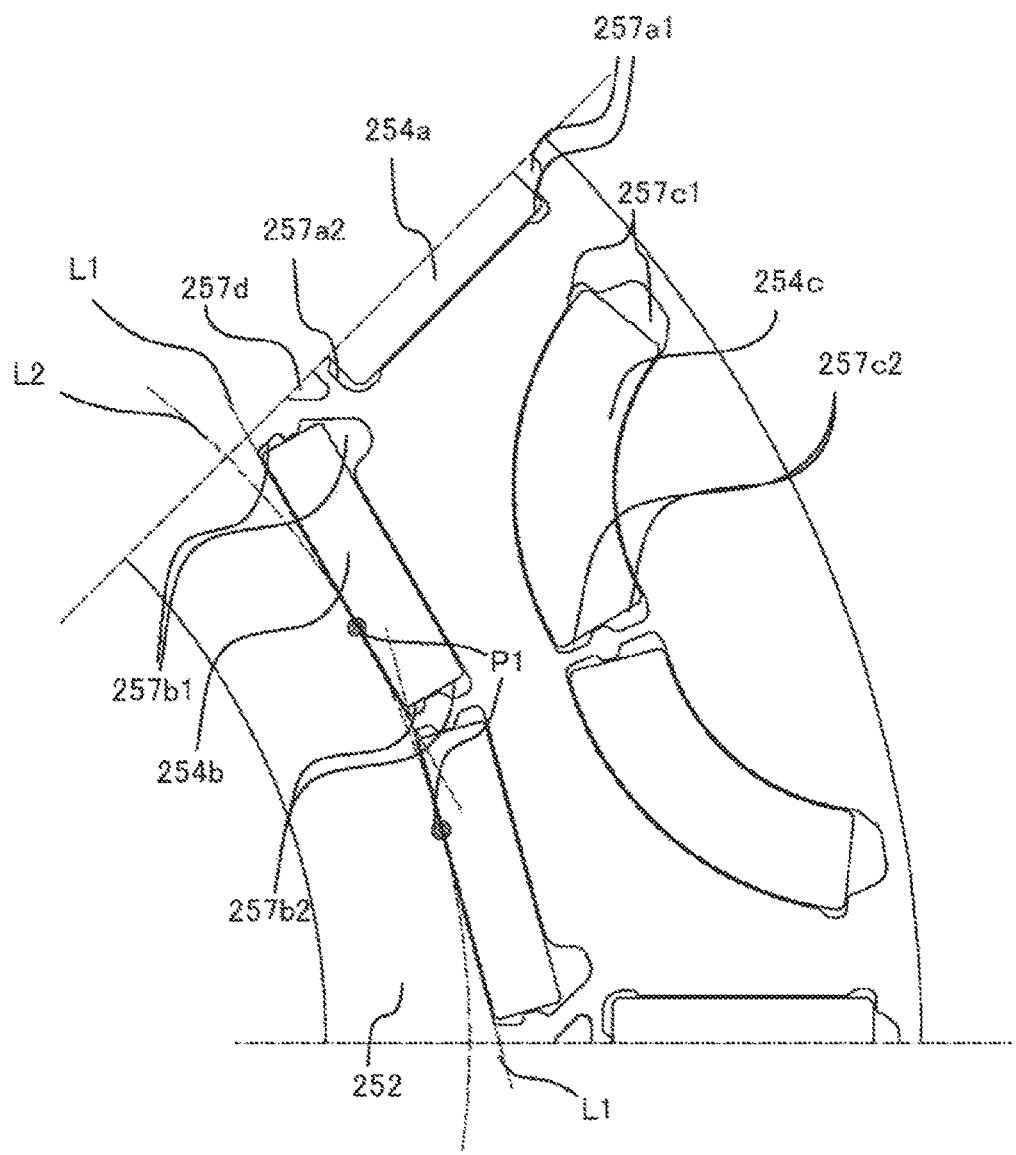
FIG. 8 is a partial enlarged cross-sectional view of the rotor 250 that uses an approximately rectangular magnet as the permanent magnet 254b.

FIG. 8 is an enlarged cross-sectional view of another rotating electric machine that adopts the present invention. Even if using a substantially rectangular magnet as the permanent magnet 254b, since there are the two tangent points P1 between: the virtual line L1 that coincides with the boundary of the magnet insertion hole, into which the permanent magnet 254b is inserted, on the inner circumference side of the rotor core 252; and the virtual line L2 that is concentric with the inner circumference of the rotor core 252, and contacts the virtual line L1, the stress can be dispersed, whereby the high-speed rotation becomes possible.

Figure 9:
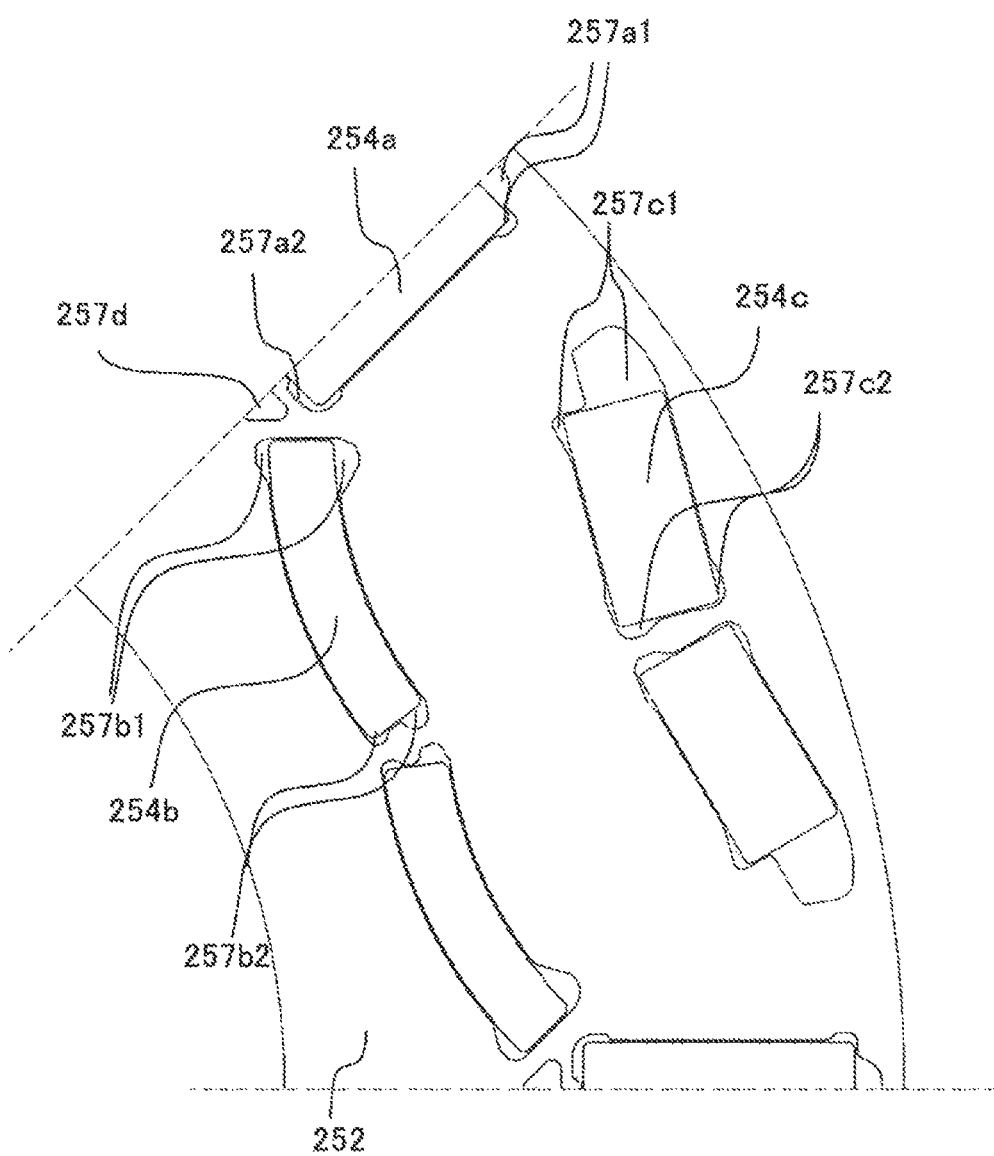
FIG. 9 is a partial enlarged cross-sectional view of the rotor 250 that uses an approximately rectangular magnet as the permanent magnet 254c.

FIG. 9 is an enlarged cross-sectional view of another rotating electric machine that adopts the present invention. Even if using a substantially rectangular magnet as the permanent magnet 254c, the same effect can be obtained by adopting the structure of the present invention. That is, the number of the permanent magnets 254c is not limited to two in one magnetic pole, and unless losing the features of the present invention, the same effect can be obtained.

Further, as shown in FIGS. 1 and 2, a vehicle with high output, which includes: the above-described rotating electric machine; the battery that supplies direct current electric power; and a conversion device that converts the direct current electric power of the battery into alternating current electric power so as to supply the alternating current electric power to the rotating electric machine, and uses a torque of the rotating electric machine as driving force, can be provided.

As described above, the rotating electric machine with the eight poles has been explained as an example, but the number of the poles is not limited, and the present invention can be applied also to a rotating electric machine with the different number of poles. Further, the present invention can be applied not only to such a rotating electric machine for driving a vehicle, but also to rotating electric machines used for various purposes. Moreover, the present invention can be applied not only to the rotating electric machines for driving, but also to various rotating electric machines including power generators. Furthermore, unless otherwise losing the features of the present invention, the present invention is not limited to the above-described embodiment at all.

REFERENCE SIGNS LIST

100: vehicle
120: engine
180: battery
200, 202: rotating electric machine
230: stator
232: stator core
236: tooth
237: slot
238: stator winding line
241: coil end
250: rotor
252: rotor core
254a to 254c: permanent magnet
257a1 to 257c2: magnetic gap
600: electric power conversion device
Φd: magnetic flux along d-axis
Φq: magnetic flux along q-axis
Φr: magnetic flux in opposing magnetic field
L1 to L2: virtual line
P1: tangent point
σ: stress vector

The invention claimed is:

1. A rotating electric machine comprising a rotor that includes:

a a plurality of d-axis magnet insertion holes into which a plurality of respective d-axis magnets are inserted; and a plurality of q-axis magnet insertion holes into which a plurality of respective q-axis magnets are inserted, wherein the d-axis magnets are arranged facing each other so as to sandwich a d-axis, each q-axis magnet is arranged on a q-axis, the d-axis magnet insertion holes and the q-axis magnet insertion holes are set to have a larger dimension than the magnets, thereby forming gaps, each q-axis magnet insertion hole has: a first gap outside the respective q-axis magnet in a radial direction of the q-axis magnet; and a second gap inside the q-axis magnet in the radial direction of the q-axis magnet, each of the first magnet insertion holes has a third gap between the d-axis magnets that face each other so as to sandwich the d-axis, the first gap is located at a center of a lateral surface of the magnet, the second gap and the third gap are located at corners of the magnets, a cross-sectional shape of the q-axis magnets in an axial direction of the rotor is rectangular, a cross-sectional shape of the d-axis magnets in the axial direction of the rotor is arc-shaped, such that the convex side thereof is directed towards the inner radial direction of the rotor, wherein two imaginary lines each coincide with a boundary of the d-axis magnet insertion hole on opposite sides of the d-axis, on an inner circumference side of the rotor; an innermost imaginary circle concentric with an inner circumference of the rotor and contacts the imaginary lines; and one or more tangent points between each imaginary line and the imaginary circle, the rotating electric machine further comprising a fourth gap that is located at a corner of the magnet.

2. The rotating electric machine according to claim 1, wherein a stator of the rotating electric machine is obtained by winding a stator winding line by distributed winding.

3. The rotating electric machine according to claim 1, wherein a residual magnetic flux density of at least one of the q-axis magnet and the d-axis magnet is from 0.3 T to 0.8 T.

4. The rotating electric machine according to claim 1, wherein a dimension of the q-axis magnet in a magnetization direction of the q-axis magnet is larger than a dimension of the d-axis magnet on the innermost circumference of the rotor in a magnetization direction of the d-axis magnet.

5. A vehicle using a torque of the rotating electric machine as driving force, comprising:
   the rotating electric machine according to claim 1;
   a battery that supplies direct current electric power; and
   a conversion device that converts the direct current electric power of the battery into alternating current electric power so as to supply the alternating current electric power to the rotating electric machine.

* * * * *